Patented Dec. 5, 1950

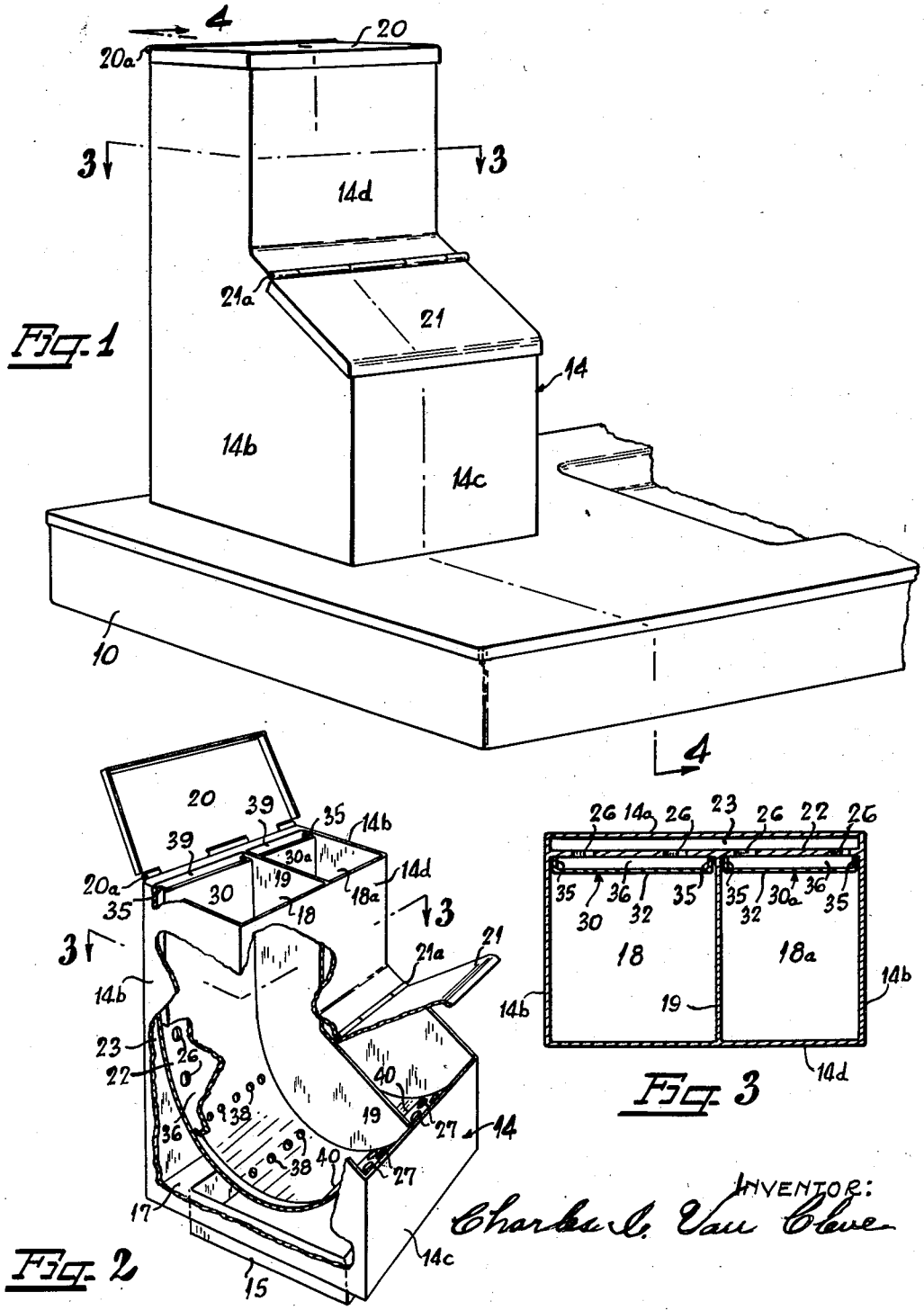

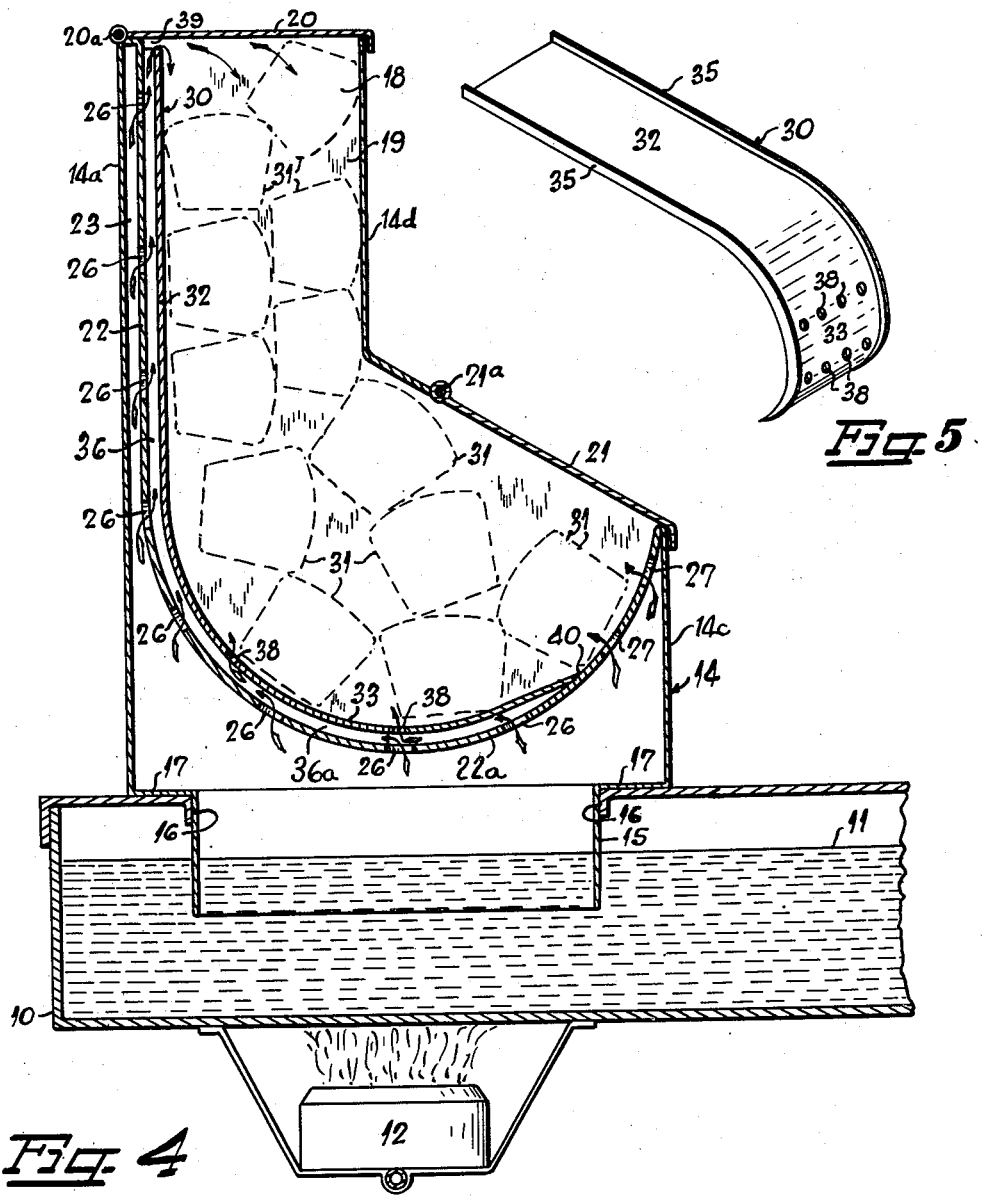

2,532,868

UNITED STATES PATENT OFFICE 2,532,868

BOTTOM DISPENSING STEAM FOOD CONDITIONER

Charles I. Van Cleve, Lynchburg, Va.

Application November 27, 1945, Serial No. 631,073

4 Claims. (Cl. 126—369)

This invention relates to a combination food conditioning and dispensing apparatus adapted to maintain the proper heat and/or moisture content of a supply of food to be served. Although the present apparatus is particularly useful in maintaining cooked food in the proper condition for serving, it obviously may be used also for cooking certain types of food.

In food establishments where hot food is continuously served to the public, it has been difficult to provide a continuous supply of food having a uniform heat and moisture content. Heretofore, various types of food conditioners and cookers have been employed which subjected a supply of food to steam treatment prior to serving, but on account of the improper application of the steam, the food has not been uniformly treated, and therefore resulted in some portions of the food becoming soggy while other portions lacked the proper moisture content. Also, a wide variation in the temperatures of the portions of foods served from such food conditioners has been experienced.

It is therefore an object of this invention to provide a food conditioner capable of controlling the application of a conditioning fluid such as hot air and/or steam to foods in a manner that all portions thereof served from the conditioner will be uniformly treated.

More specifically, it is an object of this invention to provide a combination steam table and food receptacle wherein the steam from the table is applied at select points along a column of food passing through the receptacle in such a manner that each portion of food served will have a uniform heat and moisture content. In a preferred form of the invention a vertically disposed elongated receptacle has been shown having a food replenishing opening at its upper end, and a food dispensing opening at its lower end. At both of said ends a supply of steam or other conditioning fluid is admitted, while only a relatively small supply of the fluid is admitted at points intermediate the openings, thereby preventing the column of food from receiving its final treatment until it has arrived at a position adjacent to the dispensing opening. Where steam is employed as a conditioning fluid, the above-mentioned construction provides means for progressively increasing the heat and moisture content of the column of food from the replenishing to the dispensing end of the receptacle.

It is another object of this invention to provide an elongated vertically disposed food conditioning receptacle in combination with a steam table, said receptacle having the lower dispensing end thereof communicating with and disposed adjacent to the steam supply, and having the upper replenishing end thereof communicating with and disposed a greater distance away from the steam supply whereby hot steam will be supplied to the food at the dispensing end while relatively cool or heavy steam will be supplied to the food at the replenishing end.

It is still another object of this invention to provide a food conditioning receptacle of the class described wherein the entry of the conditioning fluid into contact with the column of food is controlled by a perforated liner, removably positioned within the receptacle thereby permitting it to be easily dismantled for cleaning purposes.

Some of the objects of the invention having been stated, other objects will appear as the description proceeds when taken in connection with the accompanying drawings, in which:

Figure 1 is a perspective view showing in elevation my improved food conditioning receptacle in association with a steam table;

Figure 2 is a perspective view of the food conditioning receptacle with certain portions thereof broken away;

Figure 3 is a sectional plan view taken along the line 3—3 in Figure 1;

Figure 4 is an enlarged vertical sectional view taken along the line 4—4 in Figure 1, and Figure 5 is an isometric view of one of the liners employed for controlling the admission of conditioning fluid into the food receptacle.

Referring more particularly to the drawings, the numeral 10 designates a portion of a steam table adapted to contain a supply of water 11. A suitable burner 12 is disposed beneath table 10 for the purpose of heating the water 11 to form steam which, in turn, is employed to condition foods passing through a receptacle 14 removably mounted on said table.

Receptacle 14 is provided with a hollow neck portion 15 extending downwardly through an opening 16 in the steam table to a point preferably below the upper level of the water 11. The upper end of neck portion 15 communicates with the interior of receptacle 14 disposed concentrically thereabove, thereby providing shoulder portions 17 which form the bottom of the receptacle and rest upon the top surface of the steam table. Extending upwardly from portions 17 are the receptacle back and side walls 14a and 14b, and the front wall portion 14c. The front wall of the receptacle also comprises portion 14d located above and offset laterally with respect to portion 14c.

The interior of the receptacle 14 is divided into two vertically disposed elongated compartments 18 and 18a by means of a partition 19. Both compartments are constructed according to the same principles; however, the compartments are of different sizes so as to accommodate different kinds and shapes of foods. The upper replenishing ends of the compartments are adapted to be closed by a door 20 hingedly secured as at 20a to the upper back receptacle wall 14a, whereas the lower dispensing compartment ends are adapted to be closed by a similar door 21 hingedly secured as at 21a to the front wall portion 14d of the receptacle. It will be noted by referring to Figure 4 that the outside back wall of receptacle 14 has a back wall portion or plate 22 extending downwardly from the upper edge thereof, and in spaced relation and substantially parallel to said back wall, thereby forming a vertical conduit 23. The lower portion of plate 22 has integral therewith arcuate portion 22a which forms the bottom for the compartments 18 and 18a. It is thus seen that compartments 18 and 18a are each enclosed by a side wall 14b, front wall portion 14d, partition 19, plate or back wall portion 22, arcuate plate or bottom portion 22a and upper and lower closure members or doors 20 and 21 respectively. Suitable perforations 26 are uniformly spaced substantially throughout the entire length of plate 22 and arcuate portion 22a, except at the lower dispensing ends of the compartments where holes or perforations 27 are provided in the plate, the function of the latter perforations being to admit vapor or steam directly from the steam table into the compartments 18, 18a in a manner to be later described.

It is very essential that the admission of steam into the compartments be carefully controlled in order to insure that the food at the dispensing end will have the proper heat and moisture content, and be otherwise uniformly conditioned. If large quantities of steam should be permitted to flow directly upwardly from perforations 26, through the foodstuff within the compartments, those portions of food on the bottom of the compartments would become soggy and unfit for serving, while the moisture and heat content of the portions disposed farther away from the points of entry of the steam would contain varying degrees of heat and moisture. The present invention overcomes the above-mentioned objections by providing a liner which directs and controls the flow of conditioning fluid into the compartments in such a manner that relatively large quantities of heavy steam are introduced into the compartments at the upper replenishing ends while small quantities of hotter steam are permitted to flow directly upwardly through the bottom of the compartments and through the bulk of the food. In this manner the column of food 31, shown in dotted lines in Figure 4, is progressively conditioned as it moves downwardly toward the dispensing opening.

By referring to Figure 4, it will be evident that the vertical conduit 23 is disposed between the outer wall of the receptacle 14 and the vertical compartments 18, 18a. Therefore, the heat radiation at said outer wall surface on one hand and the heat absorption by the food in the compartments on the other, will combine to cool the steam as it travels upwardly through conduit 23, thereby producing relatively heavy steam at the upper replenishing end.

The compartments 18 and 18a are therefore provided with liners 30 and 30a respectively, said liners being identical except for the size. Figure 5 is an isometric view of the liner 30 as it appears when removed from the compartment. Liner 30 comprises a straight imperforate sheet portion 32 having integral with one end thereof an arcuate portion 33. The side edges of the liner portions 32 and 33 have outwardly projecting flanges 35, thus forming a U-shaped cross-section throughout the length of the liner. These flanges are adapted to rest against the inner surface of plate 22 and arcuate bottom portion 22a when the parts are in assembled position as shown in Figures 2, 3 and 4, and when thus assembled, the elements 22, 22a, 32, 33 and 35 cooperate to form an arcuate conduit 36a adjacent the compartment perforated bottom and a cooperating vertically disposed conduit 36 adjacent the compartment perforated back wall 22.

The arcuate portion 33 of liner 30 has perforations 38 therein which serve to admit small quantities of hot steam into the lower portion of the compartments as heretofore mentioned, and which also permit the condensation to drain back into the steam table 10. The perforations 38 serve as jets for admitting a limited amount of conditioning fluid intermediate the replenishing and dispensing receptacle ends, while the above-mentioned perforations 27 admit larger quantities of hot fluid directly from the steam table onto the food at the dispensing point. Hence perforations 27 must be somewhat larger than perforations 38. It will be noted by observing Figure 4 that the upper portion of the liner 30 stops short of the closure member 20, and thus provides an elongated orifice or slot 39 of substantial cross-sectional area for permitting relatively large quantities of heavy steam to enter the compartments 18 and 18a at the replenishing end. The vertical portion 32 of the liner, however, is not perforated. Therefore, the conditioning fluid is prevented from entering the compartments except substantially at the upper and lower extremities thereof.

Attention is also called to the fact that the end of arcuate portion 33 of the liner merges or abuts the arcuate bottom portion 22a of plate 22 as at 40, thereby permitting a short length of the plate 22 to be left uncovered by the liner and form a direct contact with the foodstuff 31 at the dispensing end of the compartment. In this short length a plurality of said relatively large holes 27 are provided which admit relatively large quantities or jets of hot steam onto the food at the dispensing point. It will be noted that the holes 27 are disposed near the steam table, and therefore hot steam will be present at this point, whereas, the slot or orifice 39 adjacent the upper ends of conduits 23 and 36 is disposed farther away and accordingly the steam will be heavier as a result of the lower temperature produced by a greater distance of travel. Only enough steam is admitted through intermediate orifices 38 to slightly increase the temperature of the food which has been initially conditioned with heavy steam from the orifice 39 at the upper replenishing end, care being taken to avoid an excess of moisture or humidity which would cause the food to become soggy.

It is therefore seen that the present apparatus first subjects the food 31 to an initial jet of heavy steam at the upper replenishing end of the receptacle, then admits controlled amounts of hotter steam as at 38 as the food moves downwardly to thereby gradually increase the heat and moisture content, and finally subjects the food to relatively large quantities of hot steam at the lower dispensing opening.

When it is desired to clean the interior of receptacle 14, the entire receptacle may be removed from the steam table and then the liners may be removed from the compartments, thus making practically all surfaces accessible.

In the drawings and specification a preferred embodiment of the invention has been shown, and although specific terms have been employed they are not intended for purposes of limitation, the scope of the invention being set forth in the following claims.

I claim:

1. In combination, a steam and vapor supply means; a food compartment comprising perforated and imperforate vertically disposed wall portions respectively, and a perforated bottom portion; an imperforate sheet portion spaced from and cooperating with the inside surface of said perforated wall portion to form an elongated vertically disposed conduit extending upwardly from said compartment bottom portion; a food replenishing inlet at the upper end of the compartment; a food dispensing outlet adjacent the compartment bottom portion; closure means for said inlet and outlet respectively; means for conducting steam and vapor from said supply through said perforated wall portion and into said vertically disposed conduit; and means disposed at the upper portion of said conduit for emitting steam and vapor from the conduit into the compartment whereby steam is emitted only at said last-named means and at said perforated bottom portion to thereby shield the food disposed intermediate the respective emitting means from the direct flow of steam and vapor.

2. A combination as defined in claim 1 wherein said perforated bottom portion forms an arcuate continuation of said perforated wall portion and wherein said imperforate sheet portion is provided with a perforated arcuate continuation disposed parallel and in spaced relation to said bottom portion.

3. A combination as defined in claim 1 wherein the path travelled by the steam and vapor from the supply through the perforated wall portion, vertically disposed conduit, the emitting means disposed at the upper portion of said conduit, and into the upper portion of the compartment is longer than the path from the supply through the perforated bottom portion and into the lower portion of the compartment, and wherein the longer path has relatively greater heat radiation surface than the shorter path, whereby the temperature of the steam and vapor emitted at the bottom portion of the compartment will be higher.

4. In combination, a steam and vapor supply means; a food compartment comprising perforated and imperforate vertically disposed wall portions respectively, and a perforated bottom portion; an imperforate sheet portion spaced from and cooperating with the inside surface of said perforated wall portion to form an elongated vertically disposed conduit extending upwardly from said compartment bottom portion; a food replenishing inlet at the upper end of the compartment; a food dispensing outlet adjacent the compartment bottom portion; closure means for said inlet and outlet respectively; spaced means cooperating with the outwardly disposed surface of said perforated wall portion to form a second conduit extending vertically alongside said first conduit, the upper and lower ends of said first conduit communicating with the upper and lower portions respectively of the compartment; and means for conducting steam and vapor from said supply into said second conduit whereby the steam and vapor will flow from said supply through said second conduit, perforated wall portion, first conduit and into the upper and lower portions of the compartment.

CHARLES I. VAN CLEVE.

REFERENCES CITED

The following references are of record in the file of this patent:

UNITED STATES PATENTS

| Number | Name | Date |
| --- | --- | --- |
| 258,739 | Foss | May 30, 1882 |
| 874,278 | Adams | Dec. 17, 1907 |
| 1,809,867 | Rittberger | June 16, 1931 |
| 1,876,614 | Claus | Sept. 13, 1932 |
| 1,928,290 | Jennings | Sept. 26, 1933 |
| 2,138,908 | Douthit | Dec. 6, 1938 |

FOREIGN PATENTS

| Number | Country | Date |
| --- | --- | --- |
| 2,973 | Great Britain | of 1806 |